Nov. 2, 1954     K. P. KENWORTHY ET AL     2,693,235
MACHINE FOR FEEDING AND SHEARING METAL RIBBON MATERIAL
Filed April 23, 1951     3 Sheets-Sheet 1
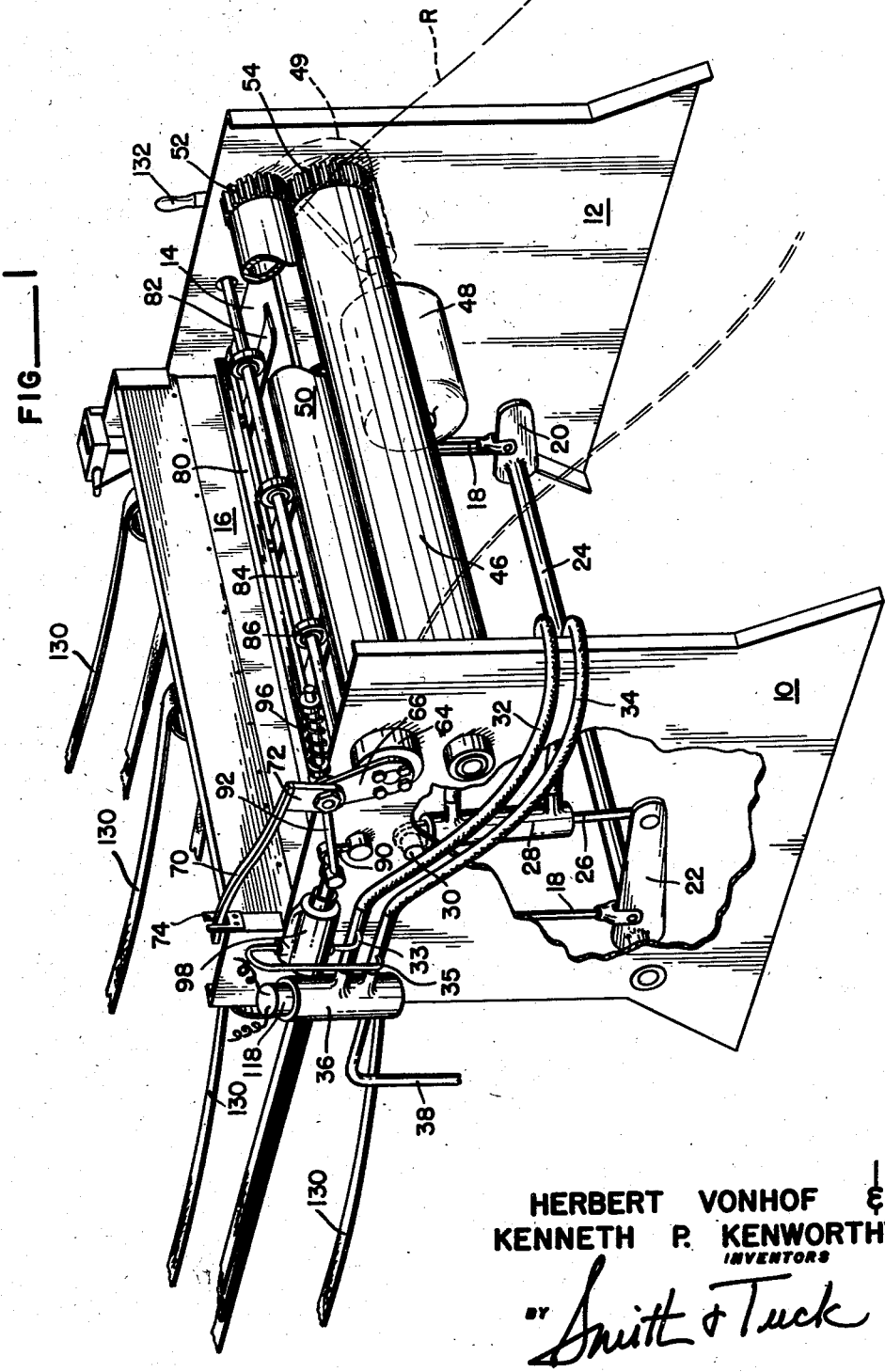
HERBERT VONHOF &
KENNETH P. KENWORTHY
INVENTORS
BY Smith & Tuck
ATTORNEYS

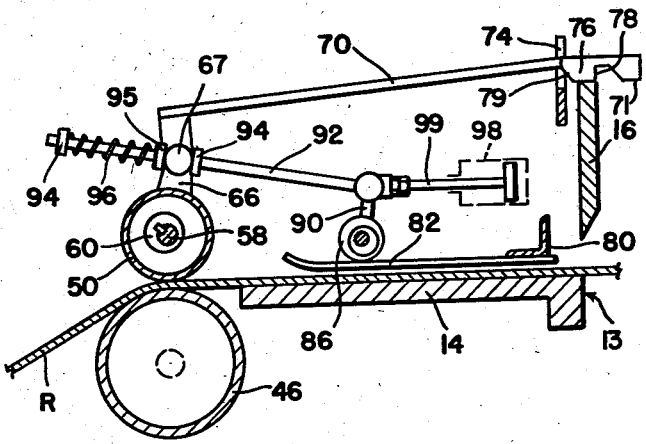
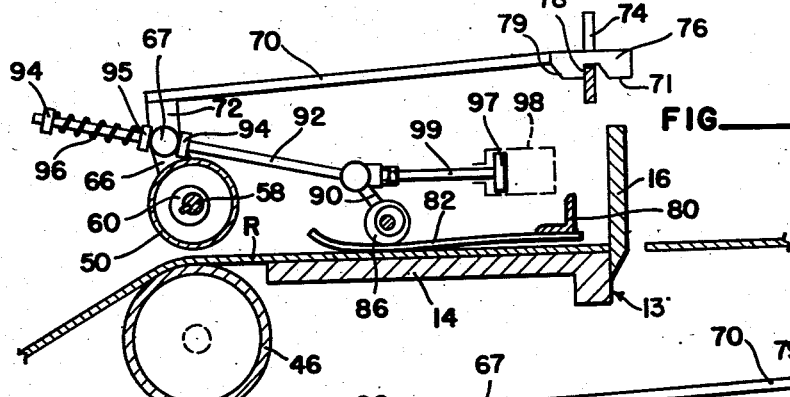
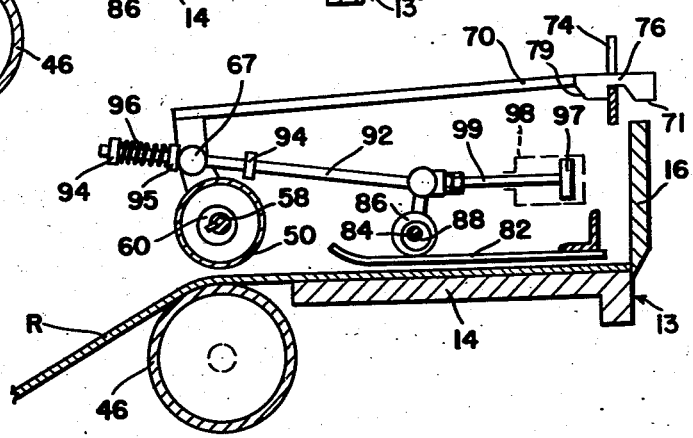

Nov. 2, 1954     K. P. KENWORTHY ET AL     2,693,235
MACHINE FOR FEEDING AND SHEARING METAL RIBBON MATERIAL
Filed April 23, 1951                                           3 Sheets-Sheet 3

HERBERT VONHOF &
KENNETH P. KENWORTHY
INVENTORS

BY Smith + Tuck
ATTORNEYS

United States Patent Office 2,693,235
Patented Nov. 2, 1954

2,693,235

MACHINE FOR FEEDING AND SHEARING METAL RIBBON MATERIAL

Kenneth P. Kenworthy and Herbert Vonhof, Seattle, Wash., assignors to Western Aluminum Corporation, Seattle, Wash., a corporation of Washington Application April 23, 1951, Serial No. 222,488

7 Claims. (Cl. 164—49)

This invention relates to improvements in a Machine for Feeding and Shearing Metal Ribbon Material and, more particularly to a shearing mechanism in which metal ribbons are fed to a shear table, arrested in motion and clamped to the table, sheared to predetermined lengths and delivered to conveyor mechanisms all in a continuous manner.

It is among the more important objects of this invention to provide a mechanism of novel construction and arrangement to feed long strips of thin metal ribbon material from a supply roll to a shear means in a high speed manner without injury to the ribbon, without discontinuing rotation of the driven members of the feeding means, and, normally, without requiring the attention of an operator other than ocassionally; to provide a novel feeding means which is rapidly disengageable from the ribbon while the same is being secured against forward motion during shearing; to provide a novel clamping means for the ribbon during non-feeding intervals which clamping means is simple of construction and rapid of operation both in its clamping and unclamping phases; to provide a conjointly operable means for both the clamping and feeding operations which is positive of action, rapid in performance, and simple of construction, adjustment and timing; to provide feeding and clamping means that is adaptable to a large range of ribbons of various thicknesses and equally operable and useful with all of them; to provide readily adjustable gauging means that operate to control the feeding, clamping and shearing parts of the combination to permit practically infinite variations of cut-sheet lengths that may be obtained from this machine; to provide simple receiving means for conveying from the shear the cut pieces of the ribbon in a manner that prevents interference between leading and following portions of the ribbon during the intervals between cutting operations; and to provide novel actuating means for the ribbon feeding, clamping, and shearing portions of the machine which is simple of construction and operation and requires the minimum of operator attention despite long runs of the machine.

These and other and more specific objects of this invention will be apparent from a study of the following specification of the invention which, for illustrative purposes, refers to the accompanying drawings, in which:

Figure 1 is a view in perspective of our feeding and shearing machine for ribbon material, portions being broken away for convenience of illustration;

Figures 2, 3 and 4 are fragmentary vertical cross-sections through the feeding, clamping and shearing portions of our machine, the three figures showing sequentially various relationships of the parts assumed during operation of the machine;

Figure 5 is a perspective view of a tie rod and its actuator employed in operating the feeding and clamping means of the machine;

Figure 6 is a perspective view of the latch arm employed in connection with the separable feeding roll;

Figure 7 is a fragmentary view in section of an end of the separable feed roll; and Figure 8 is a schematic diagram showing the pneumatic and electric system employed in the operation and control of our ribbon feeding and shearing machine.

It will be understood that this mechanism is primarily intended for use with and operation upon a metal ribbon material such, for example, as aluminum sheet stock of the thinner gauges. Such materials are usually coiled for shipment and handling and, within the limits of length that can be included in a normal coil, are practically continuous. Of course, under certain circumstances the machine may be employed to shear shorter stock and its use in such cases is likewise contemplated. A coil of metal ribbon is normally mounted upon a mandrel, which we have not shown, and the lead end is introduced to the shearing machine by being passed between a pair of feed rolls. Such rolls unwind the following portion from the supply coil and advance the leading portion across a shear table, past a shear knife, and onto a receiving conveyor. Following shearing the conveyor carries the cut pieces away. During the interval of shearing, both the feeding means is disengaged from the ribbon and the ribbon is secured to the shear table so that, when the cutting actually takes place, the ribbon is immovable.

In Figure 1 is shown the frame of the machine comprising the end standards 10 and 12 between which extends the shear table 14 at a suitable working height. Along a forward edge of the table is mounted the shear knife 16 in upright guideways incorporated in the frame in a conventional manner, hence not shown in detail. The shear blade has at each end a depending link 18. One of these links is connected to arm 20 and the other to arm 22. Both arms are part of the crank shaft 24 that is journalled at its ends below the shear blade in frame standards 10 and 12. Arm 22 is somewhat longer than arm 20 and near its end is pivotally coupled with the piston rod 26 of a double-acting fluid pressure cylinder 28. Cylinder 28 is pivotally suspended from stud 30 that is mounted in and stands out from standard 10 of the machine. Rod 26 is connected to piston 27 within cylinder 28. Fluid, such as air, under pressure is supplied to either side of the piston of cylinder 28 by means of hose conduits 32 and 34. The supply of fluid to these hoses is under the control of the valve 36 to which compressed air, for example, is supplied by means of conduit 38 from a suitable source.

Control valve 36, as seen in Figure 8, includes a pair of pistons 40 and 42 on the reciprocating piston rod 44. When pistons 40 and 42 are as shown in Figure 8 fluid pressure is supplied to the underside of actuator piston 27 and a lift is imparted to arm 22 to push up on links 18 to raise the shear blade 16. When the pistons of valve 36 are raised to block off the supply of fluid to hose 34 and to feed it to hose 32, piston 27 will move downward and draw the links 18 and shear knife 16 downward past the cutter edge 13 of table 14 to shear across a ribbon R disposed thereon. Vent openings 41 and 43 are made in the walls of valve chamber 36 in the manner shown in Figure 8 to permit exhaust when piston 27 is moved.

Adjacent the rear edge of the shear table, in feeding relation thereto, is a first feed roll 46 which is operably connected to receive driving power from motor 48 by means of chain 49 and conventional sprockets in a usual manner. Normally motor 48 operates continually and thus roller 46 turns at all times. The ends of roller 46 are journalled in the frame standards 10 and 12.

A second feed roll 50 is superposed over roll 46 to which it is connected by means of gear elements 52 and 54. Interiorly at its ends, roll 50 has free rolling bushings 56 mounted on shaft 58. At its ends shaft 58 is keyed to eccentric collars 60 within bearings 62 that are mounted in bearing holders 64 secured to the frame standards of the machine. This structure is shown in Figure 7 where there is to be seen roll lever 66 that is secured to one of the eccentric collars 60 by bolts 68. Rotation of such collar 60, in a clockwise direction in the Figure 1 showing, produces raising of roller 50 from close proximity to roller 46. Opposite rotation of the lever 66 and the eccentric collars 60 lowers the upper roller to frictional contact with a ribbon R that may be overlying the driven first roller 46.

Lever 66 has a latch arm 70 connected at its outer end by the bracket 72. Arm 70 extends forwardly into the upper portion of the path of the shear knife 16 where it passes through the fork 74. A tongue 76 depending from arm 70 forms shoulder 78 and cam surface 79. When the lever 66 is swung clockwise, as when the roller 50 is being raised, latch arm 70 is drawn rearward to such extent that the tongue is raised by surface 79 riding up on the fork crotch and shoulder 76 is disposed behind and beneath the crotch or notch of fork 74. The rear of the fork constitutes an abutment and will then restrain forward movement of the latch arm and, hence, of the lever 66. In such condition the forward end 71 of latch arm 70 overhangs the shear knife 16 in the upper limits of its path of travel. When shear blade 16 is raised upwardly, approximately to the point where its cutting edge clears the table surface, the back of the shear knife contacts and raises the end 71 of the latch arm thus disengaging the shoulder 76 from abutment with the rear of fork 74 whereupon the latch arm may again move forward as the lever 66 swings counter-clockwise in Figure 1. This movement will be described later.

Transversely of table 14 and slightly above its working surface in advance of roller 50 is a cross beam 80 that is rigidly mounted at its ends in the standards 10 and 12. Beam 80 supports, in cantilever fashion, a plurality of relatively thin, resilient, rearwardly extending clamp shoes 82 which underlie, in their mid-portions, the cross shaft 84. A roller 86 for each shoe is mounted on shaft 84. The ends of shaft 84 are secured in eccentric collars 88 suitably mounted in the frame of the machine. One of the collars is secured to shaft 84 adjacent lever 66 as seen in Figures 1–4. Clockwise swinging of lever 90 in the Figure 1 showing results in the eccentric collars 88 applying downward pressure upon shaft 84 and rollers 86 to depress the blades 82 whereupon a clamping action is obtained upon a ribbon R disposed on shear table 14 under the shoes 82.

Between levers 90 and 66 extends the tie rod 92 which is pivotally connected to lever 90 but is both pivotally and slidably connected to lever 66 by passing through pivot stud 67. The latter connection includes spaced apart rod collars 94, 94 fixed to rod 92 and movable collar 95 near the outer end of the lever 66. Between collar 95 and the outer collar 94 is located a coiled spring 96 which urges the lever 66 toward its forward position or counter-clockwise in Figure 1.

Pressure is applied to tie rod 92, to urge it rearward, by pressure cylinder 98 and its piston rod 99. Fluid under pressure is supplied to opposite sides of the piston 97 by branch conduits 33 and 35 that are connected, respectively, between hoses 32 and 34 and the interior chambers of cylinder 98. By such means, when the control valve 36 moves piston rod 99 out of its cylinder, levers 90 and 66 are swung rearward resulting in the application of clamping pressure to the ribbon portion lying on table 14 and the disengagement of the upper roll 50 from the ribbon overlying roll 46. This results in the loss of frictional driving contact between rollers 46 and 50 and the ribbon. Forward motion of the ribbon is interrupted while, simultaneously, the shear knife is actuated as has been described to cut the ribbon and separate the portion that has been advanced to in front of the shear blade 16. Also at this time latch arm 70 is engaged against the rear abutment of fork 74. As lever 22 descends when drawing down the shear knife it strikes the limit switch 100, in the manner indicated in Figure 8. Switch 100 is part of the control electrical circuit of this machine and its function will be described.

The schematic diagram of Figure 8 shows a preferable manner of connecting the various switching components of the electrical circuits of our machine. Two circuits are employed, one comprising the low voltage circuit originating with input lines 102 and 103 and the high voltage motor circuit originating with supply lines 104, 105 and 106. By means of relay switches 107, which are activated by electro-magnetic coil 108, starting current is permitted to flow to motor 48 which operates roll 46. The "on" push-button 109 controls the energization of electro-magnetic coil 108 and is manually closed. Interruption of the flow of current to the motor is obtained by breaking the energization of the solenoid 108 through manual opening of the "off" button 110.

At the same time that the motor is started, electromagnet 114 is energized to close relay switch 115 in the control circuit whereupon the relay unit 116 is activated and the whole control circuit is energized in readiness for the supply of current to solenoid 118 to produce shuttling of piston rod 44 of the control valve 36.

Included in the control circuit is switch 120 which is normally located ahead of the shear blade in the path of the advancing ribbon to be sheared. The ribbon's leading edge strikes the arm of switch 120, which is double-throw, and reverses its position in the circuit to permit current to flow to solenoid 118. Activation of solenoid 118 shifts the pistons of valve 36 causing both the shear cylinder 28 and the roll-lifting and clamp-actuating cylinder 98 to operate as has been described. Solenoid 118 holds the valve 36 in such position until the lever 22 presses down on the shear limit switch 100 and causes a break in the supply current to relay unit 116 whereupon service to solenoid 118 is disrupted. The valve 36 then returns to the position shown in Figure 8.

Under these latter circumstances the shear blade 16 is raised due to the reversed flow of fluid pressure to cylinder 28. Likewise piston 97 moves in cylinder 98 to pull upon tie rod 92 and swing lever 90 counter-clockwise thus freeing the pressure upon shoes 82 and unclamping the ribbon on the table. However, when lever 66 is latched in its rearward position, upper roll 50 is separated from roll 46 sufficiently that there is no driving contact with the ribbon, the rolls merely turning freely thereon. This action shown in Figure 4 is possible due to the sliding of rod 92 through pin 67 and the compression of spring 96 which stores energy against the moment that the lever is unlatched by the displacement of shoulder 78 from behind the fork crotch. When the shear blade has risen sufficiently to contact tongue 71 of the latching arm, and raises it free from the fork, spring 98 expands and presses lever 66 forward causing the lowering of roll 50 and the resumption of feeding action upon the ribbon. The parts are then in the relation shown in Figure 2.

The plurality of pairs of superposed conveyor belts 130 seen in Figure 1 ahead of the shear blade receive and carry away sheets cut from the ribbon. The sheets enter between the pairs of blades as part of the ribbon and, after they are cut free, travel along at a speed usually slightly faster than the feeding speed of the rollers 46 and 50. Switch 120 is normally mounted adjacent the path of travel of the sheets between belts 130 and is preferably of the type referred to as a microswitch. It is actuated by physical contact with the leading edge of a sheet which causes the movable element to swing as to the left in Figure 8. This position is held as long as the switch is in touch with the sheet but swings to the right when the rear edge of the sheet passes that point. By advancing or retracting the location of switch 120 relative the shear blade 16 it is possible to gauge the length of sheet that will be cut by our machine.

Switch 120, when it is returned to the position shown in Figure 8 produces a re-energization of the relay unit 116 in readiness for the next shearing operation to be performed.

A pushbutton switch 122 is included in the circuit to permit manual operation of the shearing means as when a forward end of a ribbon is to be initially trimmed. This switch establishes a circuit around switch 120 which may be located several feet ahead of the shear and not convenient to the operator at the moment.

We have shown a signal light 124 across the line of the control circuit to indicate when the latter is energized.

To facilitate adjustments of the ribbon, as when a new piece is being introduced to the shearing machine the outer end of shaft 58 in roll 50 has a manually operable lever 132 which can be swung to permit raising of the roll 50. Such lever may be and preferably is provided with a conventional latch means to hold roll 50 elevated when desired.

It should be clear that gear elements 52 and 54 are at all times intermeshed to greater or lesser degrees so that when they are to be closed together the teeth will automatically close without clashing. For that reason roll 50 rotates at all times that the machine is in operation, although in its upper position it will be out of driving contact with the ribbon. We normally arrange that spring 96 exerts a forward push upon lever 66 which in turn tends to press the upper roll 50 to the ribbon and lower roll 46. By this arrangement it will be seen that slight lag in the raising of the upper roll may be obtained with respect to the clamping of the ribbon R to the table.

With an understanding of the construction and operation of our machine it should be observed that our invention provides a unique and novel construction for the handling and feeding of a metal ribbon in an intermittent manner, its cutting during intervals of rest at which time portions are cut to desired length, wherein there is little or no likelihood of harming the ribbon, the length of the strips may be varied, various thicknesses of materials may be accommodated, and the cut-off pieces may be carried away quickly and safely. Further this machine provides a novel and useful synchronized feeding and clamping means which are arranged to operate conjointly in a most simple manner and with considerable rapidity and in which feeding is controlled by the location of the cutting device to the end that fed material cannot be rammed up to the shear by the feeding means.

While we have shown a preferred form of our invention it should be quite apparent to those skilled in the art that changes and modifications may be made in construction and operation and in the nature of the various components. Those which fairly come within the spirit and scope of the subjoined claims are considered to form part of our invention.

Having thus described the invention which is new and which we desire to secure by Letters Patent, we claim:

1. A feeding and shearing mechanism for metal ribbon material, comprising: a frame including a shearing table having upright guideways adjacent one edge; a shear vertically reciprocable in said guideways; means for reciprocably moving said shear; a pair of feed rolls mounted in said frame across said table from the shear in ribbon feeding relation thereto; means for constantly driving one of said rolls, the other of said rolls being separable upwardly therefrom to interrupt feeding of the ribbon; an eccentric rotatable sleeve for upwardly separating said separable roll; a first lever for rotating said sleeve; a cross beam in said frame disposed to overlie the ribbon on the table in advance of the feed rolls and behind the shear and having a plurality of rearwardly extending resilient fingers; roller means operable upon said fingers and including a rotatable eccentric element to dispose said rollers downward to press the resilient fingers to a ribbon on the table; a second lever to rotate said eccentric element; a tie rod connected to said second lever for push-pull operation thereof and to said first lever for positive pushing and delayed pulling thereof; means for reciprocably moving said tie rod, and means for restraining movement of said first lever upon returning movement of the tie rod, said means for restraining said second lever being associated with the shear and being disengageable thereby upon its return to the normal position during ribbon feeding; and resilient means operable upon the first lever to move it to normal position when the restraining means is disengaged.

2. The structure according to claim 1 in which said first lever is slidably associated with said tie rod between spaced apart collars on the tie rod, and the resilient means comprises a spring disposed between said lever and a tie rod collar.

3. The structure according to claim 1 in which said means for restraining the first lever comprises: a latch arm extending from said first lever into the upper path of the shear, and shoulder and fixed abutment means between the latch arm and the frame arranged to become operable to latch the first lever when the first lever is swung to upwardly separate the roll associated therewith.

4. A feeding and shearing mechanism for metal ribbons, comprising: a frame including a shearing table having a downwardly movable shear knife operable along an edge to shear a ribbon passed across said table; a driven roller mounted in said frame opposite said shear knife to engage the underside of the ribbon to be sheared to move it across the table; a pressure roller superimposed to said driven roller to press a ribbon thereto; means coupling said rollers for conjoint rotation during advancement of the metal ribbon; means supporting said pressure roller in said frame and including an eccentric element revoluble to raise the pressure roller from the metal ribbon and for disengaging the coupling means; a first lever connected with the eccentric element of the pressure roller; between said shear knife and the driven roller and operable upon a ribbon disposed upon said shear table, a vertically reciprocable clamping means mounted in said frame to secure the ribbon to the table; a revoluble eccentric member associated with the clamping means and connected with a second lever; a tie rod between said lever and, associated therewith, reciprocably acting means whereby the levers may be simultaneously swung; said eccentric means of the pressure roller and the eccentric means of the clamping means being arranged so that when the levers are swung together the pressure roller is raised and the clamping means engages upon a metal ribbon and secures it to the shear table; means for actuating said shear knife to cut a metal ribbon while the same is clamped to the table; a latching arm connected to the first lever and extending into the path of the shear knife; a shoulder on the latching arm and, cooperable therewith when the first lever is swung to the elevated position of the pressure roller, an abutment behind which the shoulder on the arm is disposed; and the tie rod being associated with the first lever by a resilient connection that permits the retention of the pressure roller in the elevated position while the clamping means is being disengaged and until the shear knife raises and disengages the shoulder on the latching arm.

5. A feeding and shearing mechanism for metal ribbons, comprising: a frame including a shearing table having a downwardly movable shear knife operable along an edge to shear a ribbon passed across said table; a driven roller mounted in said frame opposite said shear knife to engage the underside of the ribbon to be sheared to move it across the table; a pressure roller superposed to said driven roller to press a ribbon thereto; means coupling said rollers for conjoint rotation during advancement of the metal ribbon; means supporting said pressure roller in said frame and including an eccentric element revoluble to raise the pressure roller from the metal ribbon and for disengaging the coupling means; a first lever connected with the eccentric element of the pressure roller; between said shear knife and the driven roller and operable upon a ribbon disposed upon said shear table, a vertically reciprocable clamping means mounted in said frame to secure the ribbon to the table; a revoluble eccentric member associated with the clamping means and connected with a second lever; a tie rod between said levers and, associated therewith, reciprocably acting means whereby the levers may be simultaneously swung; said eccentric means of the pressure roller and the eccentric means of the clamping means being arranged so that when the levers are swung together the pressure roller is raised and the clamping means engages upon a metal ribbon and secures it to the shear table; means for actuating said shear knife to cut a metal ribbon while the same is clamped to the table; and said clamping means including a plurality of resilient fingers and support means therefor, said fingers being pressed downward onto the metal ribbon by the eccentric actuated member associated with the second lever.

6. In a feeding and shearing mechanism for metal ribbons of the type having a frame including a shearing table having a downwardly-movable, shear knife operable along an edge to shear a ribbon passed across said table, having a pair of rollers mounted in said frame one above another opposite said shear knife to advance said ribbon, a first of said rollers being movable vertically to separate the rollers and at least one of said rollers being driven, the improvement, comprising: pressure means including a first lever operable to move said first roller toward and away from the second roller; between said shear knife and said rollers and operable upon a ribbon disposed upon said shear table, a vertically reciprocable clamping means mounted in said frame to secure the ribbon to the table and operating means including a second lever for operating said clamping means; push-pull tie means between said levers and, associated therewith, reciprocably acting means whereby said levers may be simultaneously swung; said pressure means of said first roller and said operating means of the clamping means being arranged so that when the levers are swung together the first roller is separated from the second roller releasing the ribbon and the clamping means engages the ribbon and secures it to the table; means operative to actuate said shear knife to cut the ribbon while the same is clamped to the table; a latching arm connected to said first lever and extending into the path of the shear knife, an abutment member mounted on said frame and interengaging means between said latching arm and said abutment member operative upon separation of said rollers by said reciprocably acting means to automatically secure said latching arm preventing said first lever from returning thereby preventing said rollers from coming together; said interengaging means being released, permitting said first lever to return and said pressure means to press said first roller against the second roller, by movement of said shear knife against said latching arm when it moves away from said table after having sheared the ribbon.

7. The subject matter of claim 6 in which said tie means has resilient lost-motion connection with said first lever permitting said reciprocably acting means to move said second lever to unclamp said clamping means while said first lever remains latched by said interengaging means and automatically returning said first lever when said latching arm is released by action of said shear knife.

References Cited in the file of this patent

UNITED STATES PATENTS

| Number | Name | Date |
|---|---|---|
| 686,075 | Huber | Nov. 5, 1901 |
| 1,407,712 | Stevens et al. | Feb. 28, 1922 |
| 1,435,979 | Reed | Nov. 21, 1922 |
| 1,482,025 | Neuhengen | Jan. 29, 1924 |
| 1,567,919 | Cumfer | Dec. 29, 1925 |
| 2,346,194 | Sjostrom | Apr. 11, 1944 |